(12) United States Patent
Su et al.

(10) Patent No.: US 9,631,053 B1
(45) Date of Patent: Apr. 25, 2017

(54) POLYMERIC BENZOXAZINE RESIN STRUCTURE WITH ADAMANTANE-CONTAINING MAIN CHAIN

(71) Applicant: NATIONAL CHUNG SHAN INSTITUTE OF SCIENCE AND TECHNOLOGY, Taoyuan (TW)

(72) Inventors: Wen-Chiung Su, Taoyuan (TW); Ching-Hsuan Lin, Taichung (TW); Han-Ya Lin, Taichung (TW); Zi-Jun Chen, Taichung (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 15/207,521

(22) Filed: Jul. 12, 2016

(30) Foreign Application Priority Data

Nov. 24, 2015 (TW) .............................. 104138860 A

(51) Int. Cl.
*C08G 59/68* (2006.01)
*C08G 73/06* (2006.01)

(52) U.S. Cl.
CPC ................................... *C08G 73/06* (2013.01)

(58) Field of Classification Search
CPC .......... C08L 79/04; C08G 73/06; C08G 73/22
See application file for complete search history.

(56) References Cited

U.S. PATENT DOCUMENTS

2012/0172569 A1* 7/2012 Katagiri .................. C08L 79/04
528/127

* cited by examiner

*Primary Examiner* — Shane Fang
(74) *Attorney, Agent, or Firm* — Schmeiser, Olsen & Watts, LLP

(57) ABSTRACT

A polymeric benzoxazine resin structure with an adamantane-containing main chain produces materials of low dielectric characteristics when cured.

8 Claims, 3 Drawing Sheets

POLYMERIC BENZOXAZINE RESIN STRUCTURE WITH ADAMANTANE-CONTAINING MAIN CHAIN

CROSS-REFERENCE TO RELATED APPLICATION

This non-provisional application claims priority under 35 U.S.C. §119(a) on Patent Application No(s). 104138860 filed in Taiwan, R.O.C. on Nov. 24, 2015, the entire contents of which are hereby incorporated by reference.

FIELD OF THE INVENTION

The present invention relates to resin structures and, more particularly, to a polymeric benzoxazine resin structure with an adamantane-containing main chain, characterized in that the adamantane group of the resin reduces its dielectric constant and enhance its thermal stability.

BACKGROUND OF THE INVENTION

Phenol formaldehyde resins are synthesized by condensation polymerization of phenols and aldehydes, and most importantly by the condensation polymerization of phenol and formaldehyde. Phenol formaldehyde resins feature advantageously ease of access to raw materials, low water absorbency and excellent workability so that, when cured, phenol formaldehyde resins meet practicability needs and thus are in wide use to serve consumptive, electronic, military and architectural purposes. Recent years see the emergence of benzoxazine resin, a member of phenol formaldehyde resins. Benzoxazine resin is characterized in that, when heated, its monomers undergo a ring-opening reaction to cure, and the curing process occurs without producing water or being accompanied by any other side reaction; hence, benzoxazine resin exhibits better workability than the other phenol formaldehyde resins.

In 2005, Takeichi synthesized from aromatic diamine, bisphenol A and paraformaldehyde a polymeric benzoxazine resin (also known as polybenzoxazine precursor) with a weight-average molecular weight Mw of 6000-8900 g mol$^{-1}$ and a number-average molecular weight Mn of 2200-2600 g mol$^{-1}$. When film-coated and cured at high temperature, the polymeric benzoxazine resin surpasses non-polymeric benzoxazine in mechanical strength and toughness as well as has a glass transition temperature $T_g$ of 238-260° C. because its main chain displays a high crosslinking density. Hence, the brittleness of polybenzoxazine polymers is alleviated.

In 2000, Oihara Tamotsu synthesized benzoxazine from three different diphenol monomers by a conventional one-step technique and measured its mechanical properties and dielectric constant, thereby drawing conclusions as follows: the benzoxazine synthesized from conventional aromatic diphenol monomers has a dielectric constant $D_k$ of 3.49; the benzoxazine synthesized from aliphatic bisphenol has a dielectric constant $D_k$ of 3.22; and, with adamantane having a rigid structure, introduction of an adamantane structure-containing bisphenol increases the glass transition temperature of its cured substance and reduces its dielectric constant $D_k$ to 3.06, thereby indicating that the introduction of an adamantane structure enhances the mechanical properties and glass transition temperature $T_g$ of its cured substance and reduces its dielectric constant.

SUMMARY OF THE INVENTION

The present invention provides a polymeric benzoxazine resin structure with an adamantane-containing main chain, wherein the polymeric benzoxazine resin structure is expressed by structural formula (I) and structural formula (II) below.

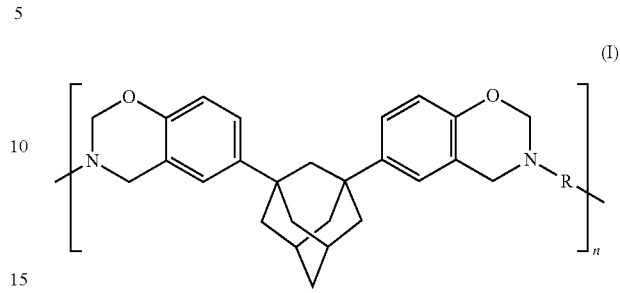

(I)

and

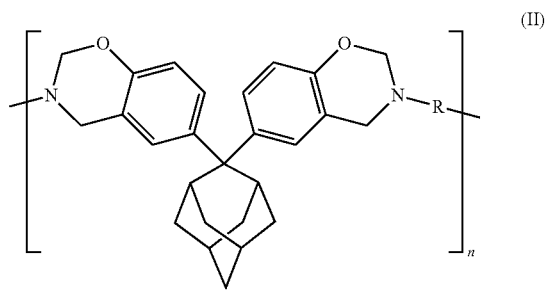

(II)

wherein R denotes one of the following groups:

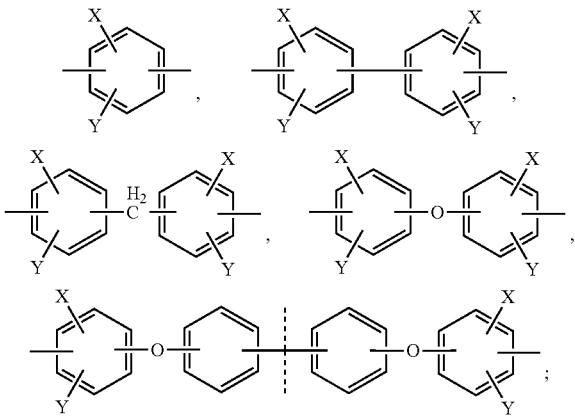

X, Y are each selected from the group consisting of hydrogen (H), C1-C6 alkyl group, and trifluoromethyl.

When the R in the foresaid structural formula (I) is

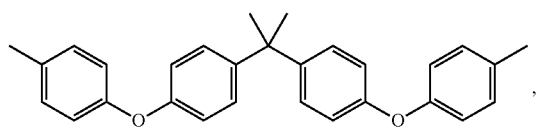

the benzoxazine resin is a compound with structural formula (I-a).

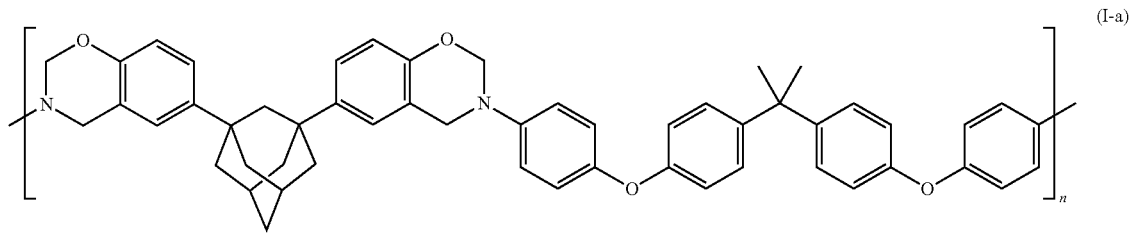
When the R in the foresaid structural formula (I) is
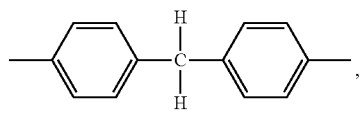
the benzoxazine resin is a compound with structural formula (I-b).
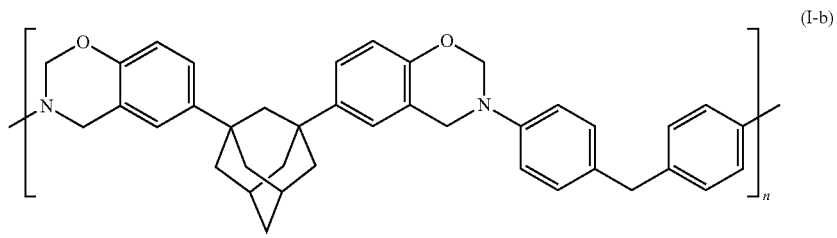
When the R in the foresaid structural formula (I) is
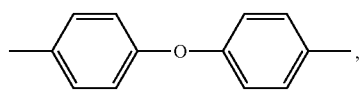
the benzoxazine resin is a compound with structural formula (I-c).
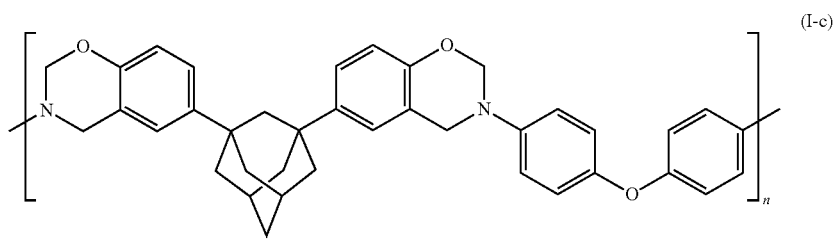
When the R in the foresaid structural formula (II) is
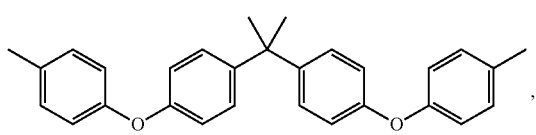
the benzoxazine resin is a compound with structural formula (II-a).

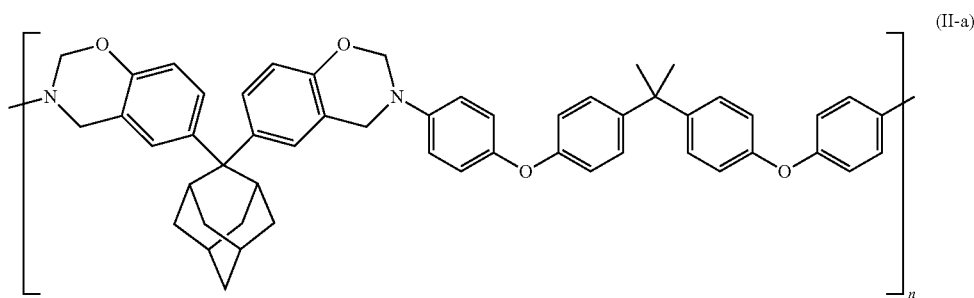

(II-a)

When the R in the foresaid structural formula (II) is

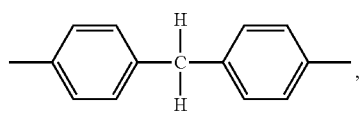

the benzoxazine resin is a compound with structural formula (II-b).

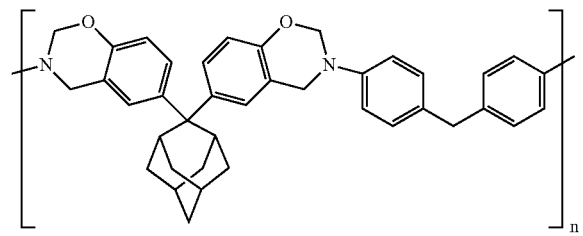

(II-b)

When the R in the foresaid structural formula (II) is

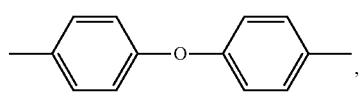

the benzoxazine resin is a compound with structural formula (II-c).

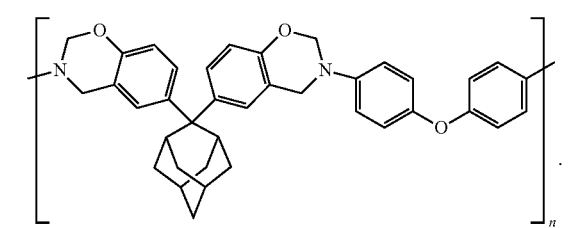

(II-c)

DETAILED DESCRIPTION OF THE PREFERRED EMBODIMENTS

Figure 1:
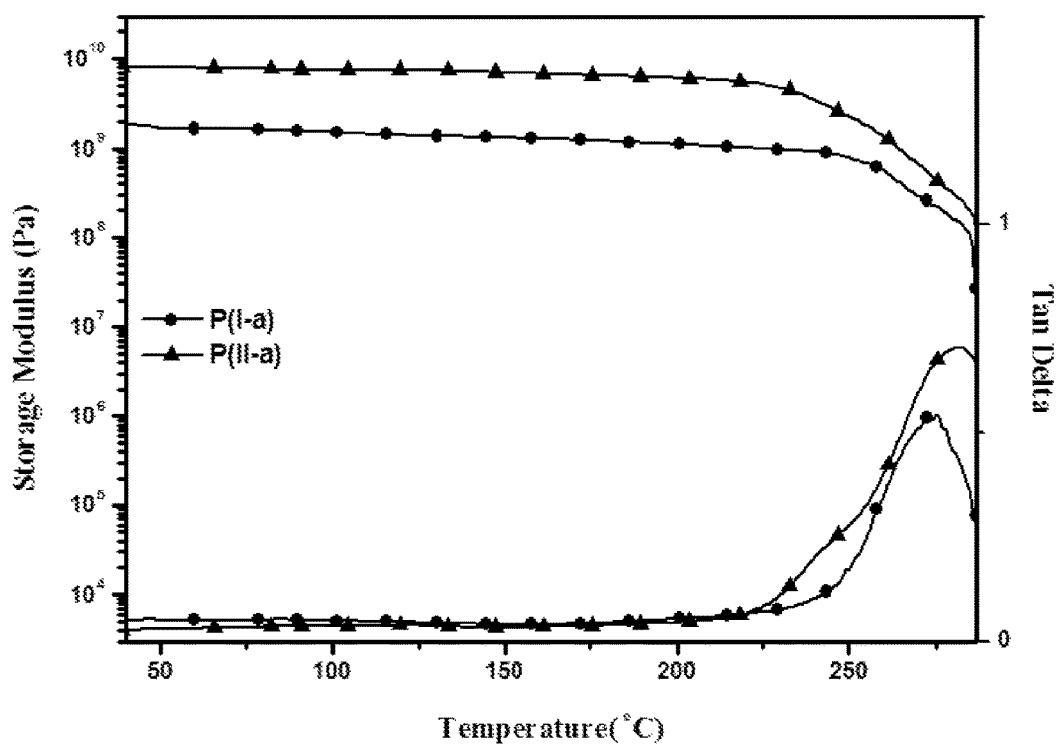
FIG. 1 is a diagram of dynamic mechanical analysis (DMA) of cured polymeric benzoxazine resins P(I-a), P(II-a) according to the present invention.

Embodiment of the present invention is expressed by equations 1, 2 and illustrated with preferred embodiments.

equation 1

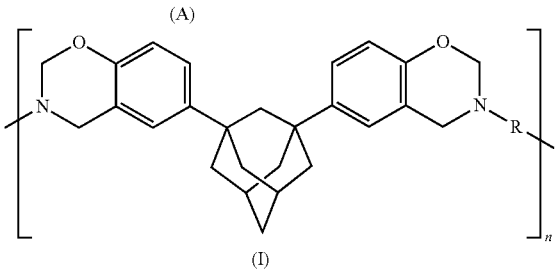

equation 2

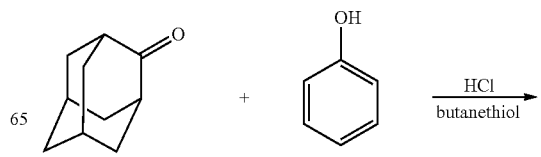

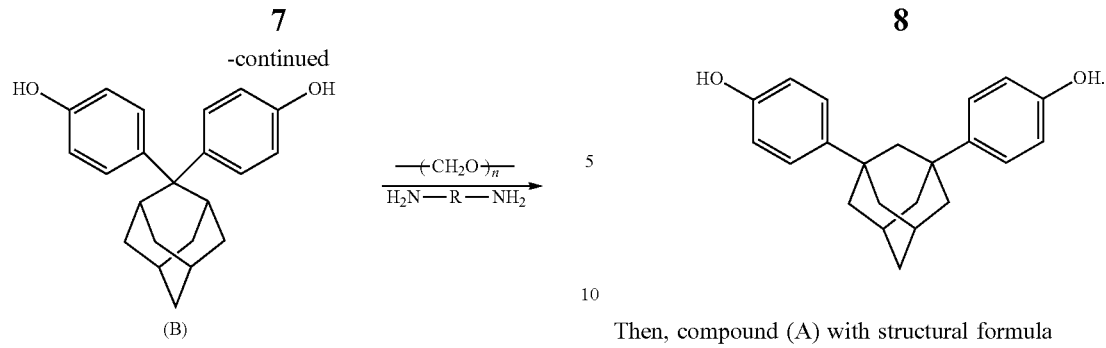

(B)

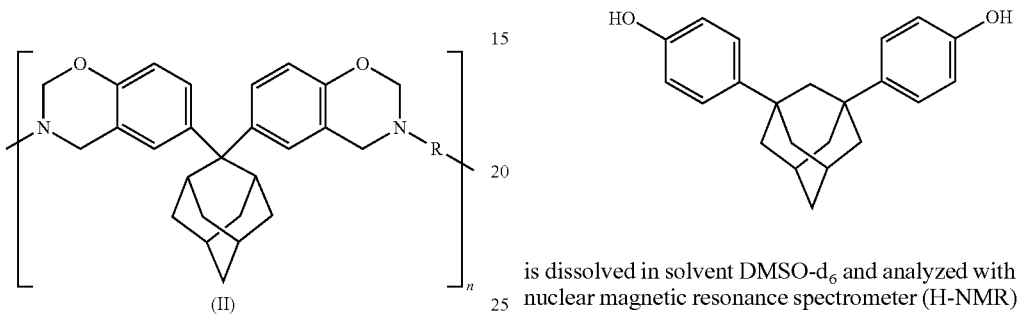

(II)

Synthesis of Compound (A) with Structural Formula

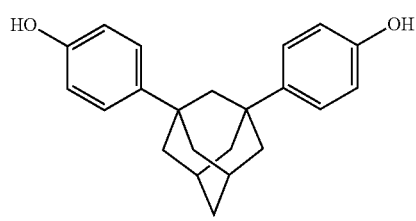 [SMILES: Oc1ccc(C23CC4CC(C2)CC(c2ccc(O)cc2)(C4)C3)cc1]

Compound (A) with structural formula

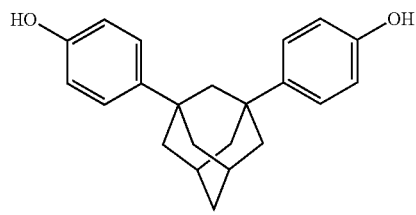 [SMILES: Oc1ccc(C23CC4CC(C2)CC(c2ccc(O)cc2)(C4)C3)cc1]

is synthesized by a reaction between 1,3-dibromoadamantane and phenol as follows: place 1 g (3.4 mmol) of 1,3-dibromoadamantane, 10 g (0.106 mmol) of phenol, and 0.18 g (1.13 mmol) of iron(III) chloride in a three-neck round-bottom flask and stir them, heat up them to 80° C., and allow them to react with each other in a nitrogen environment for 24 hours. Upon completion of the reaction, hot water is added to the three-neck round-bottom flask to remove the excess phenol. Then, recrystallization is carried out in the presence of methanol to produce black crystalline compound (A) with structural formula Then, compound (A) with structural formula

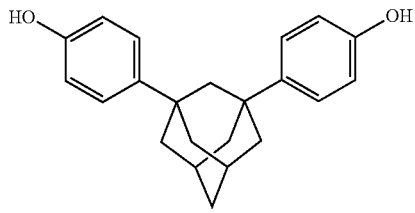 [SMILES: Oc1ccc(C23CC4CC(C2)CC(c2ccc(O)cc2)(C4)C3)cc1]

is dissolved in solvent DMSO-$d_6$ and analyzed with a proton nuclear magnetic resonance spectrometer (H-NMR) to cause a chemical shift as follows: δ=1.6-1.9 ppm (14H, adamantyl-H), 6.7 and 7.2 ppm (8H, Ar—H), 9.1 ppm (2H, OH).

Synthesis of Compound (B) with Structural Formula

Compound (B) with structural formula

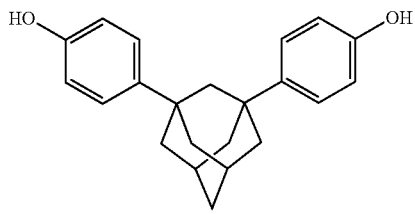 [SMILES: Oc1ccc(C23CC4CC(C2)CC(c2ccc(O)cc2)(C4)C3)cc1]

is synthesized by a reaction between is 2-adamantanone and phenol as follows: place 10 g (6.6 mmol) of 2-adamantanone, 27.3 g (6.6 mmol) of phenol, and 2.0 mL of 1-butanethiol in a three-neck round-bottom flask, heat up them to 60° C., and allow them to react with each other in a nitrogen environment for 8 hours. Upon completion of the reaction, white powder is spontaneously precipitated. After the three-neck round-bottom flask has been cooled to room temperature, the white powder is extracted by suction filtration. Then, recrystallization is carried out in the presence of toluene to produce white crystalline compound (B) with structural formula Afterward, compound (B) with structural formula

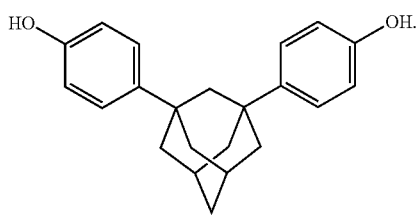 [SMILES: Oc1ccc(C23CC4CC(C2)CC(c2ccc(O)cc2)(C4)C3)cc1]

is synthesized by a reaction between compound (A), BAPP and paraformaldehyde as follows: place 0.5 g (1.56 mmol) of compound (A), 0.187 g (6.24 mmol) of paraformaldehyde, and 0.641 g (1.56 mmol) of BAPP in a three-neck round-bottom flask, in the presence of a solvent, i.e., 30 mL (1/1, V/V) of toluene/ethanol, heat up them to 80° C., and allow them to react with each other in a nitrogen environment for 12 hours. Upon completion of the reaction, hexane is produced. Then, a rinsing process is carried out several times with methanol to produce dark gray powder compound (I-a) with structural formula

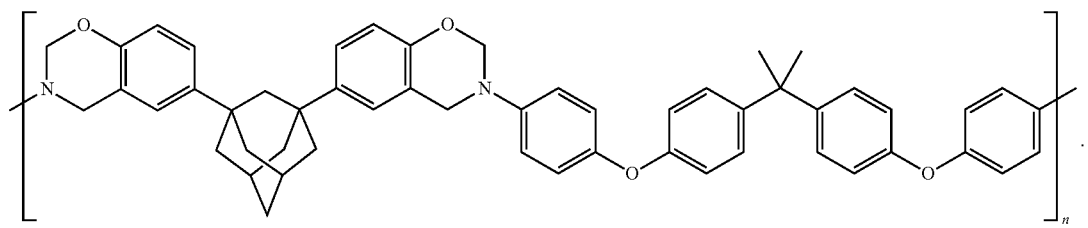

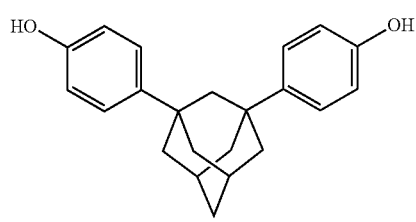 [SMILES: Oc1ccc(C23CC4CC(C2)CC(c2ccc(O)cc2)(C4)C3)cc1]

is dissolved in solvent DMSO-$d_6$ and analyzed with a proton nuclear magnetic resonance spectrometer (H-NMR) to cause a chemical shift as follows: δ=1.5-2.0 ppm (14H, adamantyl-H), 6.6 and 7.2 ppm (8H, Ar—H), 9.1 ppm (2H, OH).

Synthesis of Compound (I-a) with Structural Formula

Measure the molecular weight of the compound (I-a) and then divide the molecular weight of compound (I-a) by the molecular weight of its monomers to thereby determine that each molecule of compound (I-a) consists of around 10~100 monomers, indicating that n falls within the range of 10~100.

A scan picture taken with a differential scanning calorimeter (DSC) shows that the compound (I-a) thus synthesized has an exothermic peak at 270° C. The compound (I-a) is dissolved in solvent DMSO-$d_6$ and analyzed with a proton nuclear magnetic resonance spectrometer (H-NMR) to cause a chemical shift as follows: δ=1.5-2.0 ppm (20H, adamantyl-H and -CH$_3$), 4.5 ppm (4H, Ar—CH$_2$—N), 5.3 ppm (4H, O—CH$_2$—N), 6.6-7.2 ppm (22H, Ar—H).

Compound (I-a) with structural formula

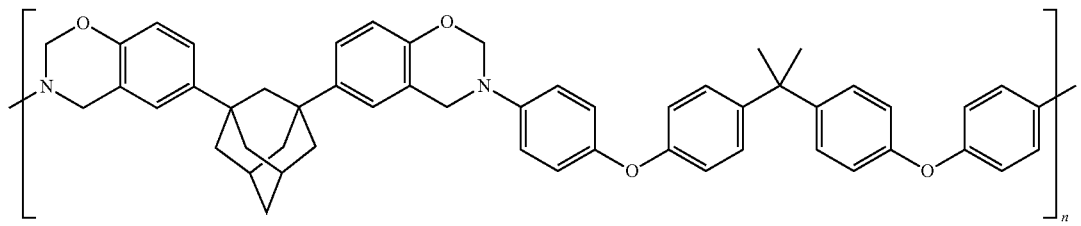

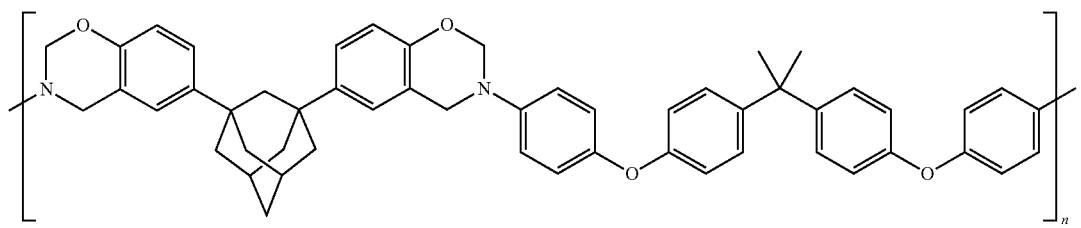

Synthesis of Compound (I-b) with Structural Formula

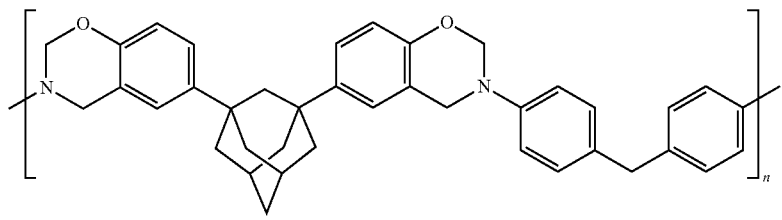

Compound (I-b) with structural formula

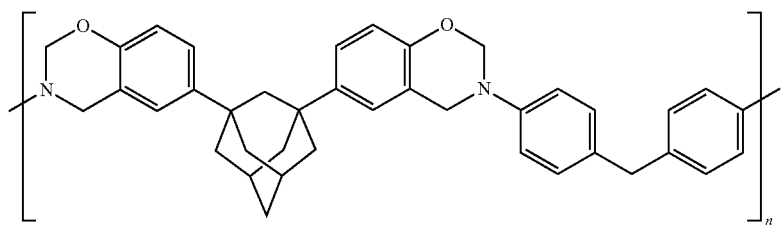

is synthesized by a reaction between compound (A), DDM and paraformaldehyde as follows: place 0.5 g (1.56 mmol) of compound (A), 0.187 g (1.56 mmol) of paraformaldehyde, and 0.3094 g (6.24 mmol) of DDM in a three-neck round-bottom flask, in the presence of a solvent, i.e., 30 mL (2/1) of toluene/ethanol, heat up them to 80° C., and allow them to react with each other in a nitrogen environment for 6 hours. Upon completion of the reaction, a rinsing process is carried out several times with methanol to produce dark gray powder compound (I-b) with structural formula

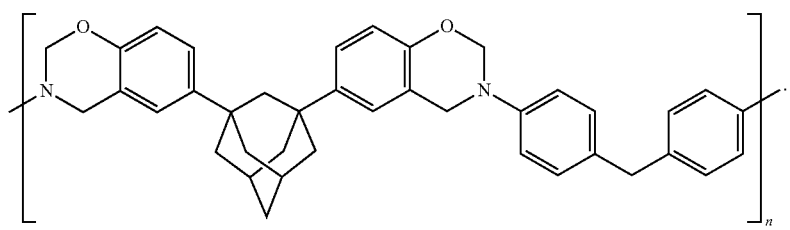

Synthesis of Compound (I-c) with Structural Formula

Compound (I-c) with structural formula

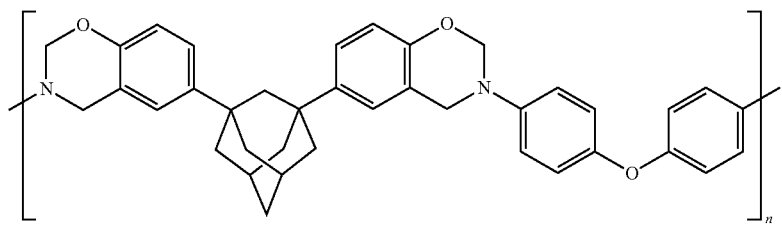

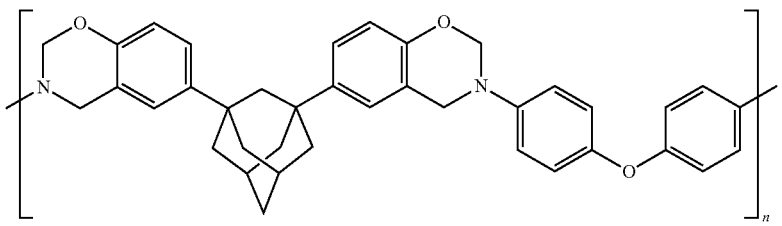

is synthesized by a reaction between compound (A), ODA and paraformaldehyde as follows: place 0.5 g (1.56 mmol) of compound (A), 0.187 g (6.24 mmol) of paraformaldehyde, and 0.31 g (1.56 mmol) of ODA in a three-neck round-bottom flask, in the presence of a solvent, i.e., 20 mL (1/1) of toluene/ethanol, heat up them to 80° C., and allow them to react with each other in a nitrogen environment for 12 hours. Upon completion of the reaction, a rinsing process is carried out several times with methanol to produce dark gray powder compound (I-c) with structural formula

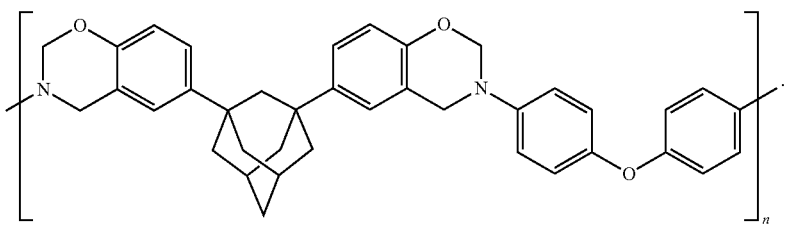

Synthesis of Compound (II-a) with Structural Formula

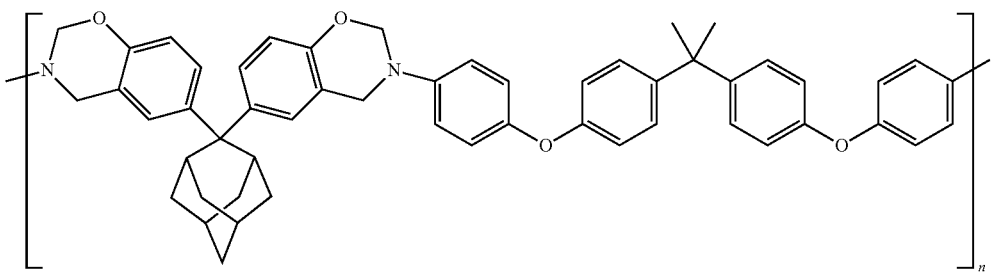

Compound (II-a) with structural formula

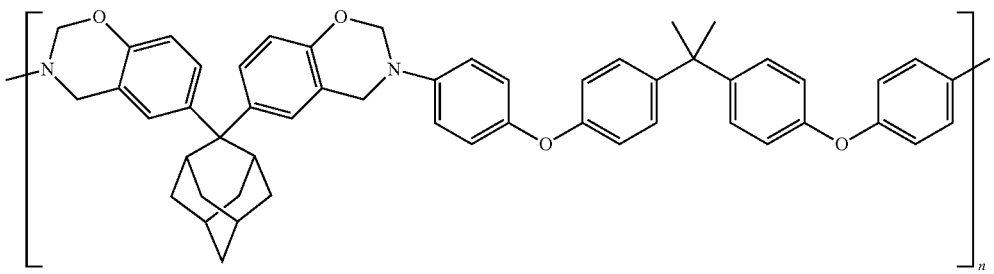

is synthesized by a reaction between compound (B), BAPP and paraformaldehyde as follows: place 0.5 g (1.56 mmol) of compound (B), 0.6404 g (1.56 mmol) of BAPP, and 0.1872 g (1.56*4 mmol) of paraformaldehyde in a three-neck round-bottom flask, in the presence of a solvent, i.e., 30 mL (1/1, V/V) of toluene/ethanol, heat up them to 80° C., and allow them to react with each other in a nitrogen environment for 19 hours. Upon completion of the reaction, hexane is produced. Then, a rinsing process is carried out several times to produce yellowish powder compound (II-a) with structural formula is synthesized by a reaction between compound (B), DDM and paraformaldehyde, as follows: place 0.5 g (1.56 mmol) of compound (B), 0.310 g (1.56 mmol) of DDM, and 0.1872 g (1.56*4 mmol) of paraformaldehyde in a three-neck round-bottom flask, in the presence of a solvent, i.e., 30 mL (1/1, V/V) of toluene/ethanol, heat up them to 80° C., and allow them to react with each other in a nitrogen environment for 22 hours. Upon completion of the reaction, hexane is produced. Then, a rinsing process is carried out several times to produce yellowish powder compound (II-b) with structural formula

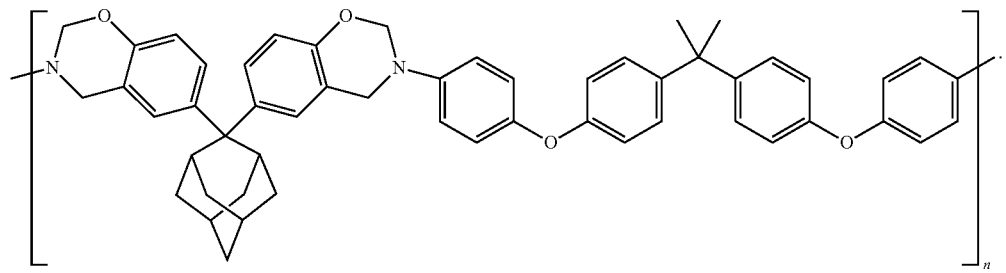

Measure the molecular weight of the compound (II-a) and then divide the molecular weight of compound (II-a) by the molecular weight of its monomers to thereby determine that each molecule of compound (II-a) consists of around 10~100 monomers, indicating that n falls within the range of 10~100.

A scan picture taken with a differential scanning calorimeter (DSC) shows that the is compound (II-a) thus synthesized has an exothermic peak at 252° C. The compound (II-a) is dissolved in solvent DMSO-$d_6$ and analyzed with a proton nuclear magnetic resonance spectrometer (H-NMR) to cause a chemical shift as follows: δ=1.5-2.0 ppm (20H, adamantyl-H and -$CH_3$), 4.5 ppm (4H, Ar—$CH_2$—N), 5.3 ppm (4H, O—$CH_2$—N), 6.6-7.2 ppm (22H, Ar—H).

Synthesis of Compound (II-b) with Structural Formula

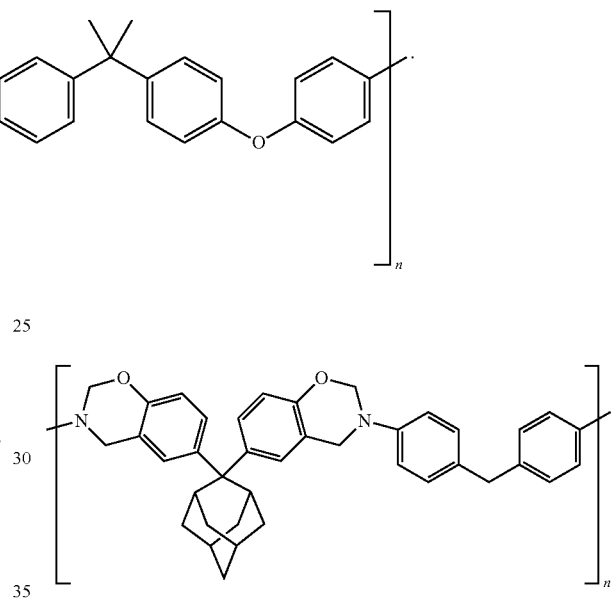

Measure the molecular weight of the compound (II-b) and then divide the molecular weight of compound (II-b) by the molecular weight of its monomers to thereby determine that each molecule of compound (II-b) consists of around 10~100 monomers, indicating that n falls within the range of 10~100.

A scan picture taken with a differential scanning calorimeter (DSC) shows that the compound (II-b) thus synthesized has an exothermic peak at 257° C. The compound (II-b) is dissolved in solvent DMSO-$d_6$ and analyzed with a proton nuclear magnetic resonance spectrometer (H-NMR) to cause a chemical shift as follows: δ=1.5-2.0 ppm (16H, adamantyl-H and -$CH_3$), 4.5 ppm (4H, Ar—$CH_2$-M, 5.3 ppm (4H, O—$CH_2$—N), 6.6-7.2 ppm (14H, Ar—H).

Synthesis of Compound (II-c) with Structural Formula

Compound (II-b) with structural formula

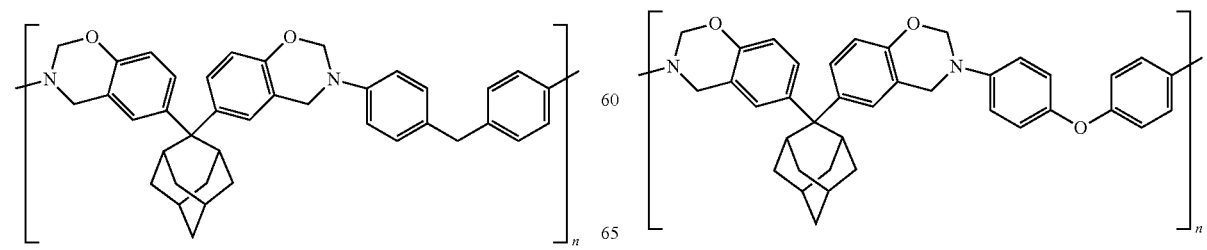

Compound (II-c) with structural formula

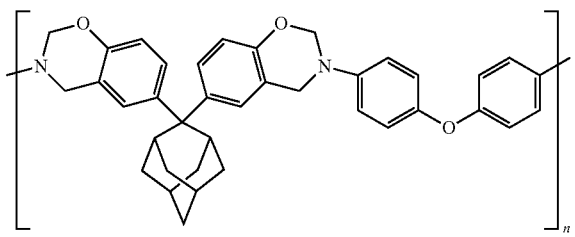

is synthesized by a reaction between compound (B), ODA and paraformaldehyde as follows: place 0.5 g (1.56 mmol) of compound (B), 0.310 g (1.56 mmol) of ODA, and 0.1872 g (1.56*4 mmol) of paraformaldehyde in a three-neck round-bottom flask, in the presence of a solvent, i.e., 30 mL (1/1, V/V) of toluene/ethanol, heat up them to 80° C., and allow them to react with each other in a nitrogen environment for 22 hours. Upon completion of the reaction, hexane is produced. Then, a rinsing process is carried out several times to produce yellowish powder compound (II-c) with structural formula

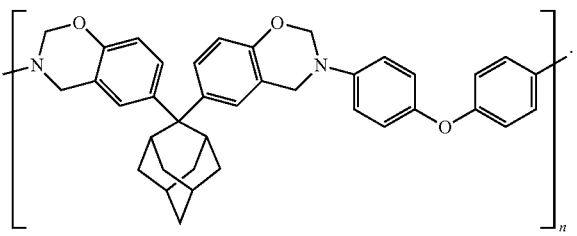

Measure the molecular weight of the compound (II-c) and then divide the molecular weight of compound (II-c) by the molecular weight of its monomers to thereby determine that each molecule of compound (II-c) consists of around 10~100 monomers, indicating that n falls within the range of 10~100.

Thermal Curing Process

Dissolve compounds (I-a), (II-a) in a solvent, such as 1,4-dioxane, and dilute them in the solvent until they have a solid content of 30 wt %. Then, bake and dry them in an oven at 90° C. for 12 hours to remove most of the solvent and then heat up them to 180° C., 200° C., 220° C. each for 2 hours. Finally, cure them at 240° C. for one hour to obtain a cured substance film, wherein their sample codes are P(I-a) and P(II-a), respectively.

Thermal Properties and Thermal Stability Analysis

The cured polymeric benzoxazine resins P(I-a), P(II-a) are analyzed with a dynamic mechanical analysis (DMA) instrument, and the analysis result is shown in FIG. 1 and described below. The corresponding temperature for tan δ peak is the glass transition temperature $T_g$. The graph of storage modulus E' shows that, after undergoing ring-opening linkcrossing, the cured polymeric benzoxazine resin P(II-a) exhibits a high crosslinking density; hence, it can be inferred that the adamantane structure of the cured substance P(II-a) has a lower free volume than the adamantane structure of the cured substance P(I-a) and thereby displays compact and rigid stacking of molecular chain segments, and in consequence the cured substance P(II-a) has a higher $T_g$ than the cured substance P(I-a).

Figure 2:
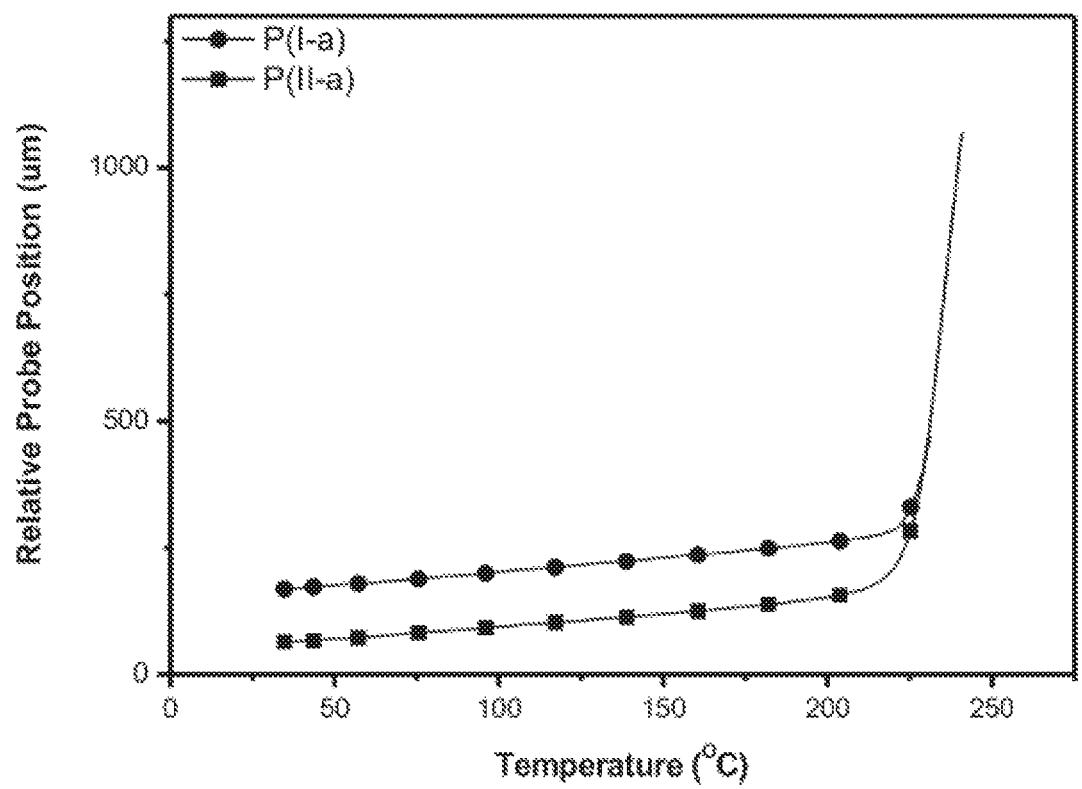
FIG. 2 is a diagram of thermal mechanical analysis (TMA) of cured polymeric benzoxazine resins P(I-a), P(II-a) according to the present invention.

The coefficient of thermal expansion is measured with a thermal mechanical analysis (TMA) instrument, and the measurement result is shown in FIG. 2 and described as follows: the rigid structure of adamantane is effective in stabilizing molecules, and thus both the cured substances exhibits optimal dimension stability.

Thermal stability properties analysis is conducted with a thermal gravimetric analysis (TGA) instrument to thereby show that both the cured substances attain 400° C. of 5% weight loss temperature $T_{d5}$ or so in a nitrogen environment and achieve 53% and 30% coke residue rates at 800° C., respectively, thereby demonstrating satisfactory thermal stability. All the thermal properties analysis data is summarized in Table 1.

TABLE 1

| | thermal properties and stability | | | | | |
|---|---|---|---|---|---|---|
| | $T_g$(° C.)[a] | $T_g$(° C.)[b] | $T_{d5\%}$(° C.)[c] | | Char yield | CTE |
| Sample ID | (DMA) | (TMA) | $N_2$ | Air | (%)[d] | (ppm/° C.)[e] |
| P(I-a) | 266 | 226 | 415 | 444 | 53 | 48 |
| P(II-a) | 282 | 236 | 393 | 417 | 30 | 50 |

[a]. Measured by DMA at a heating rate of 5° C./min.

[b]. Measured by TMA at a heating rate of 5° C./min.

[c]. Temperature corresponding to 5% weight loss by thermogravimetry at a heating rate of 20° C./min.

[d]. Residual weight % at 800° C.

[e]. Coefficient of thermal expansion ranges from 50° C. to 150° C.

Analysis of Refractive Index and Dielectric Constant

Figure 3:
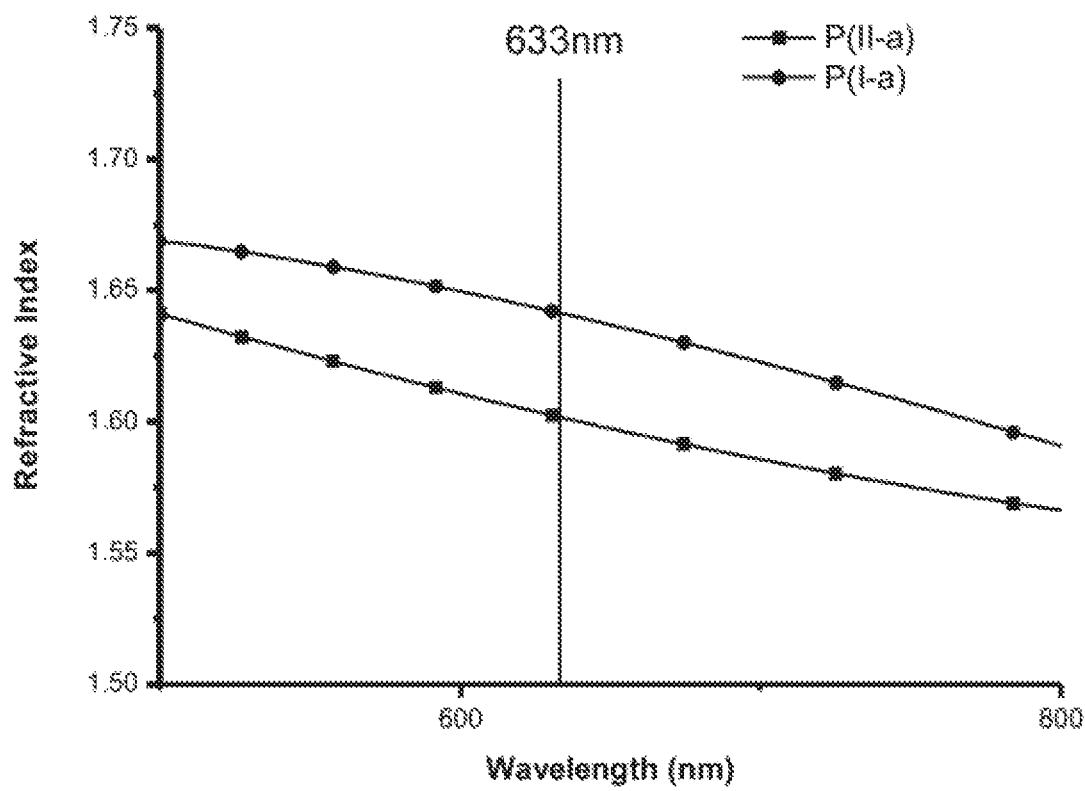
FIG. 3 is a dielectric diagram of cured polymeric benzoxazine resins P(I-a), P(II-a) according to the present invention.

The refractive index of the cured polymeric benzoxazine resins P(I-a), P(II-a) is measured with an ellipsometer, and then the refractive index at wavelength 633 nm is substituted into the relation of dielectric constant E for conversion, yielding dielectric constants of 2.96 and 2.82. Benzoxazine resins synthesized from conventional bisphenol F exhibit a dielectric constant E of 3.15. Therefore, the introduction of an adamantane structure into molecular chains is effective in reducing the dielectric constant. The result of the analysis of the refractive index and dielectric constant is summarized in Table 2, whereas a graph of refractive index is shown in FIG. 3.

TABLE 2

| refractive index and dielectric constant | | |
|---|---|---|
| Sample | Refractive Index [a] | Dielectric Constant [b] |
| P (I-a) | 1.6413 | 2.96 |
| P (II-a) | 1.6017 | 2.82 |
| F-BAPP[c] | 1.6924 | 3.15 |

[a] Refractive index n is measured at 633 nm

[b] Dielectric constant $\epsilon = 1.1\, n^2$

[c] Cured substances of polybenzoxazine synthesized from bisphenol F and BAPP

What is claimed is:

1. A polymeric benzoxazine resin with an adamantane-containing main chain, with the polymeric benzoxazine resin structure expressed by structural formula (I) below, (I)

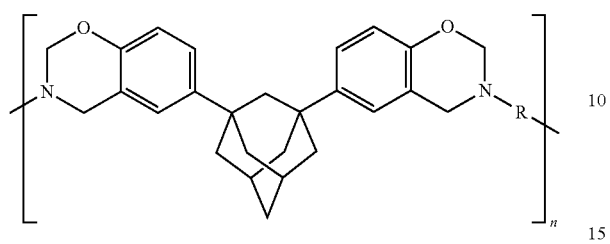

wherein R denotes one of groups below,

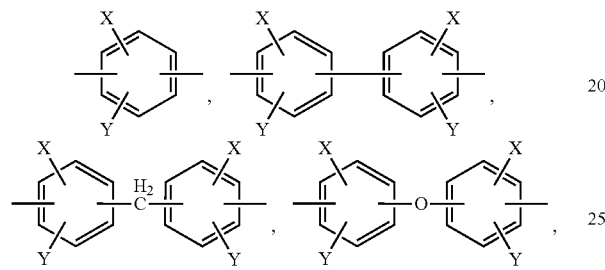

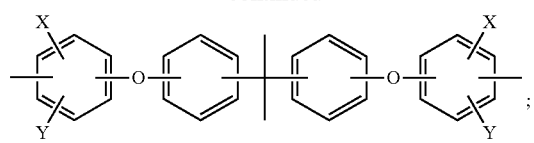

n is the repeating unit;

X, Y are each selected from the group consisting of hydrogen (H), C1-C6 alkyl group, and trifluoromethyl.

2. The polymeric benzoxazine resin of claim 1, wherein the R denotes

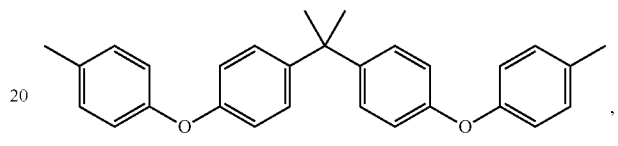

and the structural formula (I) is

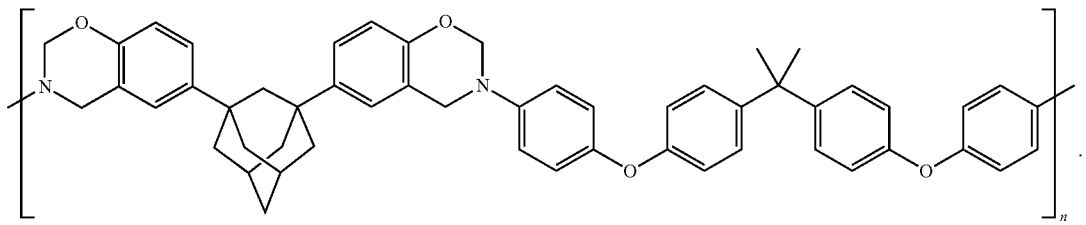

3. The polymeric benzoxazine resin of claim 1, wherein the R denotes

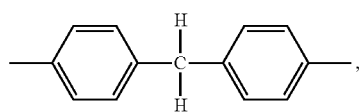

and the structural formula (I) is

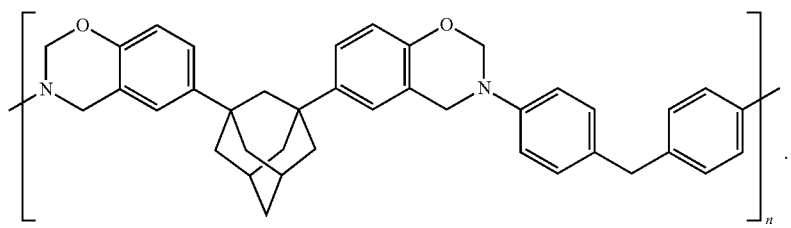

4. The polymeric benzoxazine resin of claim 1, wherein the R denotes

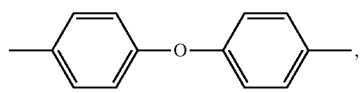

and the structural formula (I) is

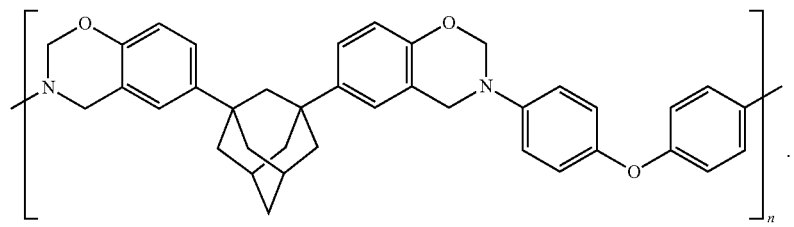

5. A polymeric benzoxazine resin with an adamantane-containing main chain, with the polymeric benzoxazine resin structure expressed by structural formula (II) below,

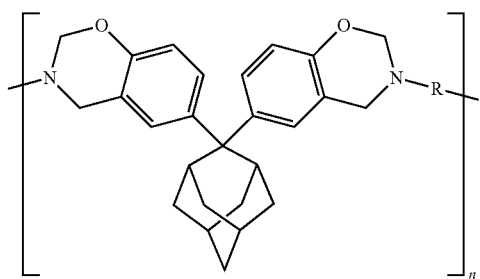

(II)

wherein R denotes one of groups below,

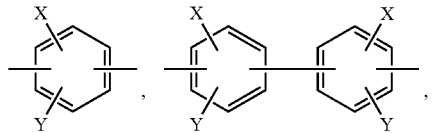

-continued

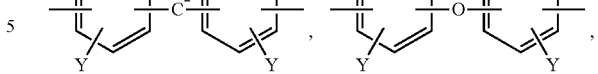

-continued

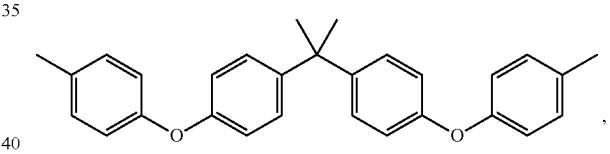

n is the repeating unit;

X, Y are each selected from the group consisting of hydrogen (H), C1-C6 alkyl group, and trifluoromethyl.

6. The polymeric benzoxazine resin of claim 5, wherein the R denotes

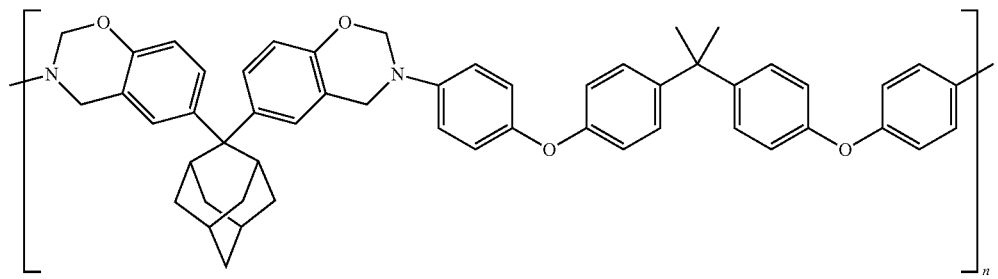

and the structural formula (II) is

7. The polymeric benzoxazine resin of claim 5, wherein the R denotes

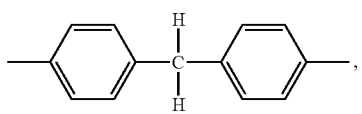

and the structural formula (II) is
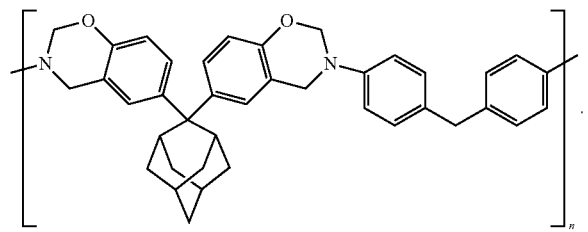
8. The polymeric benzoxazine resin of claim 5, wherein the R denotes
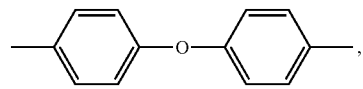
and the structural formula (II) is
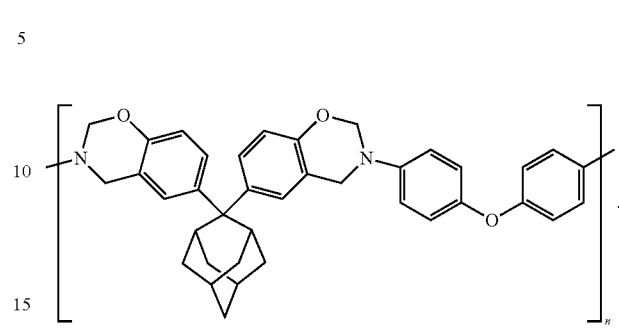
* * * * *